US011847432B2

(12) United States Patent
Madhugiri et al.

(10) Patent No.: US 11,847,432 B2
(45) Date of Patent: Dec. 19, 2023

(54) SYSTEM AND METHOD FOR GENERATING ACCESSIBLE USER EXPERIENCE DESIGN GUIDANCE MATERIALS

(71) Applicant: VMWARE, INC., Palo Alto, CA (US)

(72) Inventors: Vijayakumar Madhugiri, Bangalore (IN); Sandeep L. Hegde, Bangalore (IN); Prashanna Hanumantha Rao, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 14 days.

(21) Appl. No.: 17/494,042

(22) Filed: Oct. 5, 2021

(65) Prior Publication Data

US 2023/0022493 A1 Jan. 26, 2023

(30) Foreign Application Priority Data

Jul. 17, 2021 (IN) .............................. 202141032270

(51) Int. Cl.

| | |
|---|---|
| *G06F 9/44* | (2018.01) |
| *G06F 9/455* | (2018.01) |
| *G06F 9/445* | (2018.01) |
| *G06F 8/20* | (2018.01) |
| *G06V 30/19* | (2022.01) |
| *G06V 30/413* | (2022.01) |
| *G06F 16/958* | (2019.01) |

(52) U.S. Cl.
CPC .............. *G06F 8/20* (2013.01); *G06F 16/986* (2019.01); *G06V 30/19* (2022.01); *G06V 30/413* (2022.01)

(58) Field of Classification Search
CPC ......... G06F 8/20; G06F 16/986; G06V 30/19; G06V 30/413
See application file for complete search history.

(56) References Cited

U.S. PATENT DOCUMENTS

| | | | |
|---|---|---|---|
| 10,579,346 B2 * | 3/2020 | Yan ...................... | G06F 11/0766 |
| 10,789,315 B1 * | 9/2020 | Zoller .................... | G06F 16/34 |
| 10,839,039 B1 * | 11/2020 | Wiley .................... | G06F 16/957 |

(Continued)

FOREIGN PATENT DOCUMENTS

| | | | |
|---|---|---|---|
| AU | 2017201756 A1 * | 10/2017 | |
| WO | WO-2018148619 A2 * | 8/2018 | .......... G06F 11/3086 |
| WO | WO-2020264053 A1 * | 12/2020 | .......... G06F 40/205 |

OTHER PUBLICATIONS

Tarmo Robal, Ontology Design for Automatic Evaluation of Web User Interface Usability, 2017, pp. 1-8. https://ieeexplore.ieee.org/stamp/stamp.jsp?tp=&arnumber=8125425 (Year: 2017).*

(Continued)

*Primary Examiner* — Mongbao Nguyen
(74) *Attorney, Agent, or Firm* — LOZA & LOZA, LLP

(57) ABSTRACT

A system and method for generating accessible user experience (UX) design guidance materials for software products uses page elements that are optically extracted from an input UX prototype page image and automatically classified into predefined element types to find accessibility rules for at least some of the extracted page elements. At least one accessible UX design guidance material is generated for the input UX prototype page image that indicates the extracted page elements and the accessibility rules corresponding to at least some of the extracted page elements.

17 Claims, 11 Drawing Sheets

(56) References Cited

U.S. PATENT DOCUMENTS

| | | | | |
|---|---|---|---|---|
| 11,334,323 | B1* | 5/2022 | Hatfield | G06F 40/216 |
| 11,475,002 | B1* | 10/2022 | Raghavan | G06F 16/90335 |
| 11,544,331 | B2* | 1/2023 | Balakrishnan | G06F 16/955 |
| 2014/0351796 | A1* | 11/2014 | Gur-esh | G06F 11/3644 717/126 |
| 2017/0249319 | A1* | 8/2017 | Savarkar | G06F 16/951 |
| 2017/0277804 | A1* | 9/2017 | Jadhav | G06F 16/958 |
| 2019/0042397 | A1* | 2/2019 | Vignesh R | G06F 11/3692 |
| 2019/0250891 | A1* | 8/2019 | Kumar | G06K 9/6218 |
| 2020/0160748 | A1* | 5/2020 | Hans | G01C 21/3608 |
| 2020/0217677 | A1* | 7/2020 | Wang | G01C 21/3415 |
| 2020/0233924 | A1* | 7/2020 | George | G06F 40/186 |
| 2020/0327564 | A1* | 10/2020 | Simard | G16H 40/63 |
| 2020/0372205 | A1* | 11/2020 | Bradley | G06F 40/103 |
| 2021/0150263 | A1* | 5/2021 | Corwin | G06F 9/451 |
| 2022/0121723 | A1* | 4/2022 | Page | G06F 11/0784 |
| 2022/0237398 | A1* | 7/2022 | Asermely | G06F 3/0483 |
| 2022/0292971 | A1* | 9/2022 | Park | G06V 20/56 |
| 2022/0300524 | A1* | 9/2022 | Banerjee | G06F 16/958 |
| 2022/0309037 | A1* | 9/2022 | Gutierrez | G06F 16/93 |

OTHER PUBLICATIONS

Swikruti U. Dongaonkar, Accessibility Analyzer: Tool for New Adaptations in Government Web Applications to Improve, 2017, pp. 1-5. https://ieeexplore.ieee.org/stamp/stamp.jsp?arnumber=8463757 (Year: 2017).*

Helani Wanniarachchi, A framework for building web sites that are friendly to visually impaired, 2013, pp. 1-8. https://ieeexplore.ieee.org/stamp/stamp.jsp?tp=&arnumber=6422840 (Year: 2013).*

W3C, "Introduction to Web Accessibility", https://www.w3.org/WAI/fundamentals/accessibility-intro/, retrieved Oct. 26, 2021, 7 pgs.

Byrne-Haber; Sheri, "Building a Robust Accessibility Program; VMware is building a new high-impact accessibility program for its customers with disabilities", https://medium.com/vmwaredesign/building-a-robust-accessibility-program-803b3ee6aa71, Aug. 6, 2019, 7 pgs.

Vmware, "Accessibility", https://www.vmware.com/in/help/accessibility.html, retrieved Oct. 26, 2021, 4 pgs.

Wikipedia, "Accessibility testing", https://www.w3.org/wiki/Accessibility_testing, retrieved Oct. 26, 2021, 17 pgs.

* cited by examiner

FIG. 2

VMware Cloud — Log in

< Desktop as a S service

200

∨ 0. Preview — Preview the process for creating managed desktops

Desktop as a service

This task guide will walk you through creating and managing virtual desktops.

There are two components to setup this solution (A) Provision VDI Infrastructure
You'll start with provisioning the requires VDI infrastructure using VMware Cloud on AWS.

(B) Assign Desktops
After provisioning VDI infrastructure switch to Horizon Cloud Console to assign desktops.

Related video and resources

2:00

We recommend to read the prerequisite checklist before you start

[ GET PREREQUISITE CHECKLIST ]

[ LOG IN TO PROVISION VDI INFRASTRUCTURE ]

> 1. VDI Capacity — Specify the capacity of VDI infrastructure
> 2. Configure Network — Specify Management Subnet and Gateway details
> 3. Access — Specify access details
> 4. Acknowledge Cost — Charges begin as soon as you start deploying

| Node Type | Elements | a11y rule | Code |
|---|---|---|---|
| Header | VMware Cloud | { Headings should logically progress so that sections containing content are formatted using heading styles } | { <h1> VMware Cloud</h1> } |
| Footer | © 2020 VMware Inc | { Make footer elements accessible } | { <footer> © 2020 VMware Inc</footer> } |
| Links | Login, Desktop as a Service | { Clarity, Readability and Distinctiveness is needed for the links } | { <a href='daas.html' title='click here to daas o-accesskey='s'> Desktop as a Service </a> } |
| Media | Video Audio | { Audio - Text versions of any audio files should be made available. Video - For people in the deaf community or for those hard of hearing, captioning and transcripts can provide synchronized text when viewing a video or a transcript text file that can be read separately } | { <audio controls> <source src="horse.ogg" type="audio/ogg"> <source src="horse.mp3" type="audio/mpeg"> Your browser should support the audio tag. </audio> <p> text support for audio tag</p> <video width="320" height="240" controls> <source src="forrest_gump.mp4" type="video/mp4"> <track src="subtitles_no.vtt" kind="subtitles" srclang="no" label="Norwegian"> </video> } |
| Icons | Special characters | { always pair an icon with text on the screen, making both clickable } | { <span onclick='collapsorexpand()' title='click here to expand/collapse o-accesskey='s'></span> } |

SYSTEM AND METHOD FOR GENERATING ACCESSIBLE USER EXPERIENCE DESIGN GUIDANCE MATERIALS

RELATED APPLICATIONS

Benefit is claimed under 35 U.S.C. 119(a)-(d) to Foreign Application Serial No. 202141032270 filed in India entitled "SYSTEM AND METHOD FOR GENERATING ACCESSIBLE USER EXPERIENCE DESIGN GUIDANCE MATERIALS", on Jul. 17, 2021, by VMware, Inc., which is herein incorporated in its entirety by reference for all purposes.

BACKGROUND

Making a site or platform accessible is often an afterthought, where web designers and content creators try to squeeze accessibility (ally) guidelines into an otherwise finished design. Executing accessibility adjustments just before a product release might involve multiple teams, which may include product designers, user interface (UI) developers, quality assurance (QA) personnel and ally consultants, and could span multiple iterations impacting the release itself.

Majority of the accessibility tools currently available focuses on evaluating only live sites or platforms to provide reports identifying ally issues and required corrective actions. Static user experience (UX) designs can follow ally rules only to a certain extent and might not specify granular detail that could aid during UI development. However, it is not easy for a product designer to share exact ally indicators as there are various levels and standards with which to adhere. Thus, there is a need for a better solution to generate UX designs for sites and platforms.

SUMMARY

A system and method for generating accessible user experience (UX) design guidance materials for software products uses page elements that are optically extracted from an input UX prototype page image and automatically classified into predefined element types to find accessibility rules for at least some of the extracted page elements. At least one accessible UX design guidance material is generated for the input UX prototype page image that indicates the extracted page elements and the accessibility rules corresponding to at least some of the extracted page elements.

A computer-implemented method for generating accessible UX design guidance materials for software products in accordance with an embodiment of the invention comprises receiving an input UX prototype page image of a software product, optically extracting page elements from the input UX prototype page image, automatically classifying the extracted page elements into predefined element types, based on classification of the extracted page elements, finding accessibility rules for at least some of the extracted page elements from a data store of accessibility rules, and generating at least one accessible UX design guidance material for the input UX prototype page image, wherein the at least one accessible UX design guidance material indicates the extracted page elements and the accessibility rules corresponding to at least some of the extracted page elements. In some embodiments, the steps of this method are performed when program instructions contained in a non-transitory computer-readable storage medium are executed by one or more processors.

A system for generating accessible user experience (UX) design guidance materials for software products in accordance with an embodiment of the invention comprises memory and at least one processor configured to receive an input UX prototype page image of a software product, optically extract page elements from the input UX prototype page image, automatically classify the extracted page elements into predefined element types, based on classification of the extracted page elements, find accessibility rules for at least some of the extracted page elements from a data store of accessibility rules, and generate at least one accessible UX design guidance material for the input UX prototype page image, wherein the at least one accessible UX design guidance material indicates the extracted page elements and the accessibility rules corresponding to at least some of the extracted page elements.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

FIG. 2 shows a UX prototype page image of a software product being developed in accordance with an embodiment of the invention.

FIG. 4 depicts a table showing an example of information that is produced by an accessibility rule identifier of the accessible UX design system in accordance with an embodiment of the invention.

FIG. 5 shows an example of an accessible list generated by an accessibility rule identifier of the accessible UX design system in accordance with an embodiment of the invention.

FIG. 7 shows an example of a descriptor file in the form of a JavaScript Object Notation (JSON) object produced by a descriptor file generator of the accessible UX design system in accordance with an embodiment of the invention.

Throughout the description, similar reference numbers may be used to identify similar elements.

DETAILED DESCRIPTION

Figure 1:
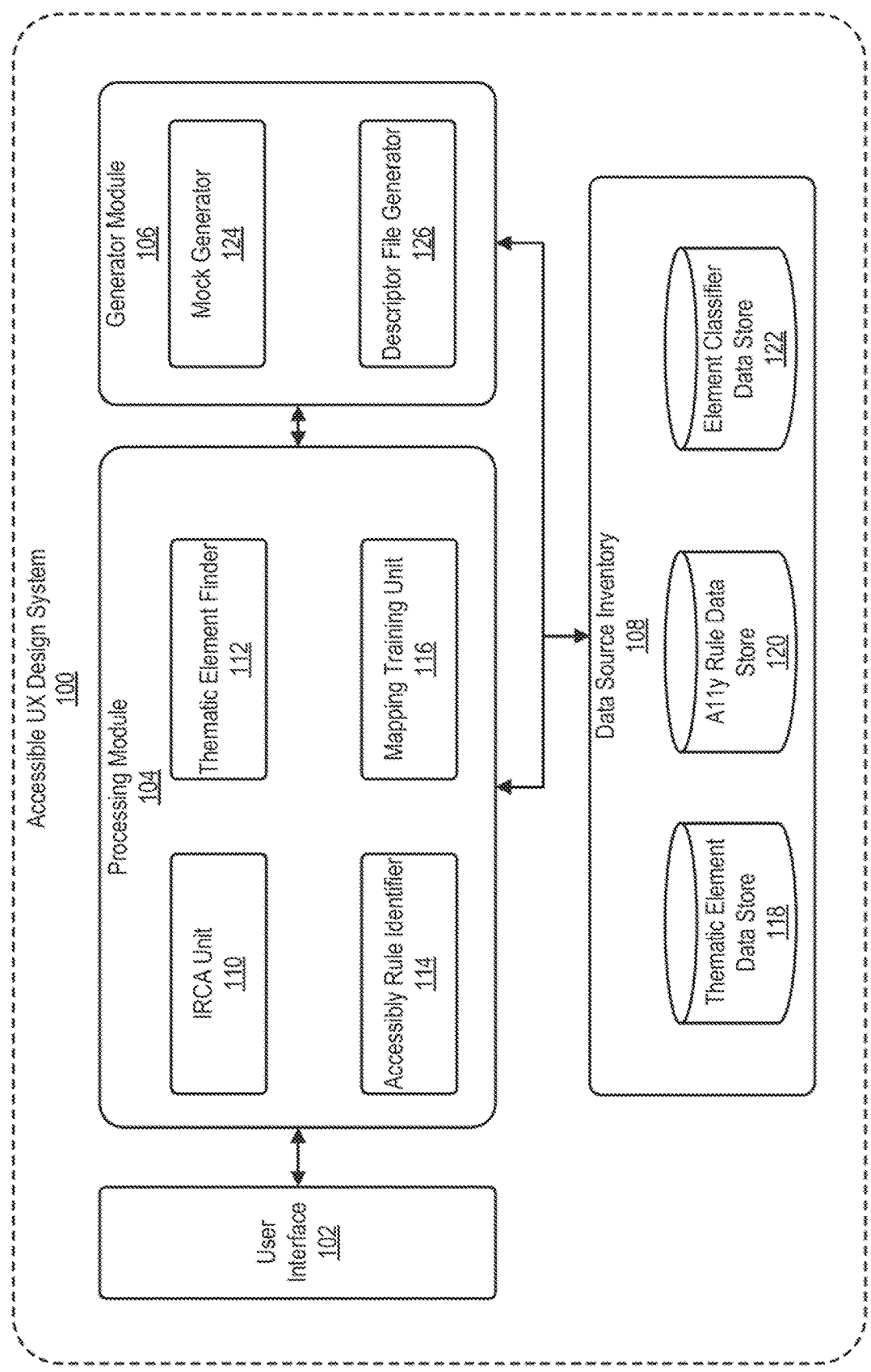
FIG. 1 is a block diagram of an accessible user experience (UX) design system in accordance with an embodiment of the invention.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Changes made in the last 2 years in National and European regulations introduced the Web Content Accessibility Guidelines (WCAG), EN 301 549 and Section 508 of the Rehabilitation Action 1973 as a main approach to demonstrate compliance regarding accessibility of Web content. These "standards" require assessment of the accessibility of all the existing products and also development of new products through the use of techniques for WCAG 2.1 and other standards. Web accessibility allows people with cognitive difficulties, vision impairment, or deaf/hard of hearing gain access to online content, such as webpage contents, electronic documents and multimedia. Part of this accessibility includes content designed to work specifically with assistive devices, such as screen readers, alternative keyboards, or joysticks that are used by people with a range of impairments.

It is simple to avoid web accessibility issues by having a strong familiarity with the WCAG 2.0 and other standards, and by following practices and checklists that address the most common accessibility issues. Another important point to remember is that accessibility is better addressed in the earlier design stages and development rather than being dealt with as an afterthought so that code need not be retroactively changed later. It is also important to remember that once a website or application has been released with accessibility adherence, there is still a need to maintain the product continuously for accessibility compliance.

Whether one develops or manages one's website, starting with accessibility in mind means one can optimize the foundation of one's site and avoid costly fixes in the future. Even before development begins, one should start asking important questions such as:

What accessibility standards/guidelines/rules should be followed?

Who is responsible for the site's accessibility compliance?

Are our design mocks or prototypes accessible?

By clearly answering questions like these, one can make sure that accessibility is one of the factors that guides the site's design and development. This helps one to set clear goals for the development team by enforcing accessibility rules strictly on the user experience (UX) designs or prototypes till the development completion.

FIG. 1 shows an accessible UX design system 100 in accordance with an embodiment of the invention that can provide accessibility guidance for development of a software product, such as websites, applications and platforms, in particular, at early stages of development. As shown in FIG. 1, the accessible UX design system 100 includes a user interface 102, a processing module 104, a generator module 106 and a data source inventory 108. As explained below, using information in the data source inventory 108, the processing and generator modules 104 and 106 operate to process an input UX prototype page image of a software product being developed, which is received via the user interface 102, and generate accessible UX design guidance materials with required implementation details in a format for developers to easily consume. The input UX prototype page image may an image of a mock page of the software product.

The user interface 102 of the accessible UX design system 100 operates to receive UX prototype page images of software products being developed as input, which are then processed by the processing module 104. In an embodiment, the user interface 102 allows a user to input one UX prototype page image at a time so that the processing module 104 can determine the basic layout of each page, as explained below. In some embodiments, the user interface 102 may also ask the user about the presence of any special components in the input UX prototype pages, such as, but not limited to, steppers, progress trackers, accordions, data grids, and status badges, to fetch predefined and pre-processed data about these components, which will be used to correctly classify the special components.

An example of an input UX prototype page image 200 that can be received by the user interface 102 is illustrated in FIG. 2. The input UX prototype page image 200 shows various elements of the prototype page, for example, headers, labels, video, icons and hyperlinks ("links") (see FIG. 6, where the page elements are indicated by numbers 1-32). Textual content in the prototype page can be both a textual element and a link, such as the textual content "Desktop as a Service", which is both a header and a link.

The processing module 104 of the accessible UX design system 100 operates to process an input UX prototype page image and generate information regarding page elements found in the UX prototype page image that is relevant for accessible UX design considerations. As shown in FIG. 1, the processing module 104 includes an image recognition and content analyzer (IRCA) unit 110, a thematic element finder 112, an accessibility rule identifier 114 and a mapping training unit 116.

The IRCA unit 110 operates to optically extract all identifiable elements in the input UX prototype page image. In particular, the IRCA unit 110 uses an Optical Character Recognition (OCR) technique to parse each line of the input UX prototype page image and to identify or determine characters, icons, numbers and other different elements of the input UX prototype page image for extraction, including special components that were specified by the user. The extracted page elements from the input UX prototype page image includes, but not limited to, text, icons, images, video, audio and special components, such as steppers, progress trackers, accordions, data grids, and status badges. The IRCA 110 unit analyzes the content of the extracted elements and present the elements in a format, which can be utilized by the thematic element finder 112 for further processing. For special components, the IRCA unit 110 may first identify the special components and then fetch predefined data for the special components from the data source inventory 108 to ensure that the special components are correctly classified later. In an embodiment, the IRCA unit 110 uses an OCR engine to determine the page elements in the input UX prototype page image. The OCR engine may use a computer model that is trained using artificial intelligence techniques to learn and recognize page elements in input UX prototype page images, even images having poor image quality.

For the optically found page elements, the IRCA unit 110 may provide various information regarding each of the page elements. For "text" page elements, the IRCA unit 110 may just provide the "text" of these page elements. However, for certain page elements, such as special components, media (audio, video, etc.) and links, the IRCA unit 110 may provide other information. As an example, for each of these page elements, the IRCA unit 110 may provide a unique identifier (ID), the media type for the page element, and location information, e.g., X and Y coordinates, of the page element in the input UX prototype page image. Below is an example of information provided for different media types.

```
[{
    "Media": [{
        "id": "123",
        "media-type": "Audio",
        "x-coordinate": "120",
        "y-coordinate": "100"
    }, {
        "id": "456",
        "media-type": "Video",
        "x-coordinate": "333",
        "y-coordinate": "456"
    }, {
        "id": "789",
        "media-type": "Image",
        "x-coordinate": "111",
        "y-coordinate": "222"
    }, {
        "id": "789",
        "media-type": "HyperLink",
        "x-coordinate": "777",
        "y-coordinate": "999"
    }]
}]
```

The thematic element finder 112 operates to determine element or node types of the extracted page elements of the input UX prototype page image provided by the IRCA unit 110 using information stored in a thematic element data store 118 and an element classifier data store 122 of the data source inventory 108, which may be stored in any computer storage. In an embodiment, the different element types include standard HyperText Markup Language (HTML) semantic element types, such as links (<a>), lists (<li>), unordered lists (<ul>), images (<img>), texts (<p>), labels (<label>) etc. Thus, in this embodiment, the extracted page elements from the IRCA unit 110 are segregated or grouped into different HTML semantic element types by the thematic element finder 112. The parsed content from the IRCA unit 110 may be classified into different element types by the thematic element finder 112 using one or more machine learning algorithms, such as multiclass classification algorithms, artificial neural networks and decision trees, to classify the extracted page elements into the different element types. In particular, the thematic element finder 112 produces an element-type map, which is a collection of extracted page elements and their associated element types, using predefined thematic elements in the thematic element data store 118. An example mapping is shown below:

| Element Type | Applicable Page Elements |
| --- | --- |
| Header | {VMware Cloud} |
| Footer | { © 2020 VMware, Inc |
| Links | {Login, Desktop as a Service} |
| Media | {Video and Audio} |
| Icons | {special characters} |

The resulting element-type map can be viewed as a list of thematic elements, where the extracted page elements from the IRCA unit 110 have been classified or identified as different predefined element types, which can be HTML semantic element types. This thematic element list is transmitted from thematic element finder 112 to the accessibility rule identifier 114. In addition, the thematic element list is used to update the information in the thematic element data store 118 so that the predefined thematic elements in the thematic element data store can be used to better segregate extracted elements in subsequent executions. Consequently, the predefined thematic elements are updated with the user inputs entered via the user interface 102. Thus, the predefined thematic elements in the thematic element data store 118 can be continuously enhanced for better segregation of elements in subsequent processes.

Figure 3:
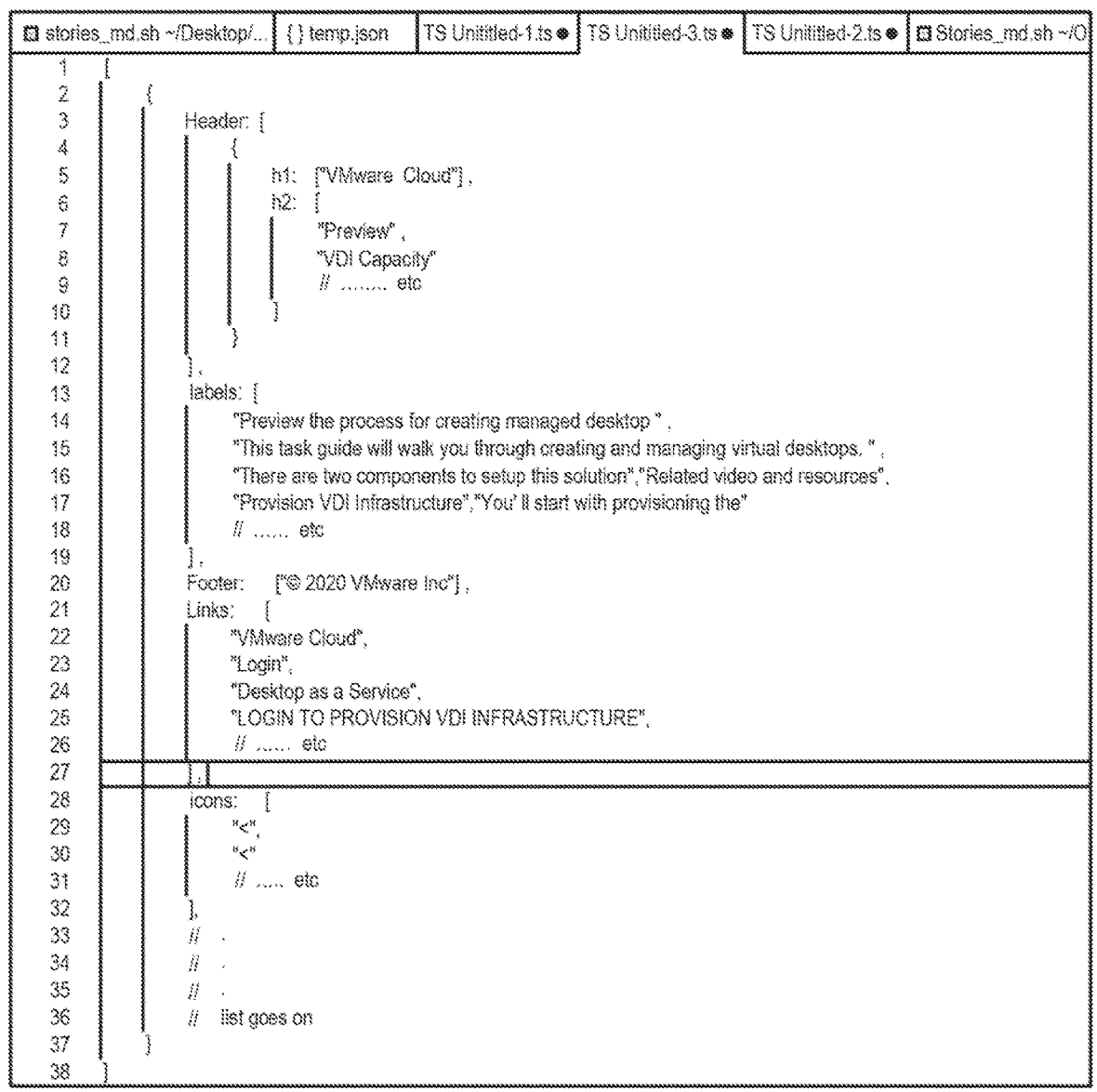
FIG. 3 shows an example of a list of thematic elements produced by a thematic element finder of the accessible UX design system in accordance with an embodiment of the invention.

In FIG. 3, an example of a list 300 of thematic elements produced by the thematic element finder 114 in accordance with an embodiment of the invention is depicted. As illustrated in FIG. 3, the thematic element list 300 may include the extracted page elements associated with different thematic element types as thematic elements, such as header elements, label elements, footer elements, link elements and icon elements. Although not shown in FIG. 3, any media, links and special components found in the input UX prototype page image will be similarly included in the list 300 with all their metadata details. For media, links and special components, the list 300 may include other information described above, such as locations of these media, links and special components.

The accessibility rule identifier 114 operates to find out the applicable accessibility rule for each extracted thematic element from the input UX prototype page image. The thematic element list produced by the thematic element finder 112 is used as an input to identify the respective accessibility rule to be applied as the software product is being further developed. The accessibility rule identifier 114 uses an ally rule data store 120 in the data source inventory 108, which include accessibility rules or guidelines for different page element types, and the thematic element list to produce a list with the extracted page elements of the input UX prototype page image and their respective accessibility rules. This list will be referred to herein as the accessible list. In an embodiment, the accessibility rule identifier 114 may also attach one or more ways of implementing each rule/guideline in the accessible list by providing code snippets that can be used by a developer when developing the software product with accessibility considerations. In addition, the accessibility rule identifier 114 may identify respective HTML sematic tags, such as h1, h2, footer, a, etc. and added to the accessible list. The accessibility rule identifier 114 may use a machine-learned mapping model to identify the a11y rules, the code snippets and the HTML sematic tags for the extracted thematic elements.

Figure 5:
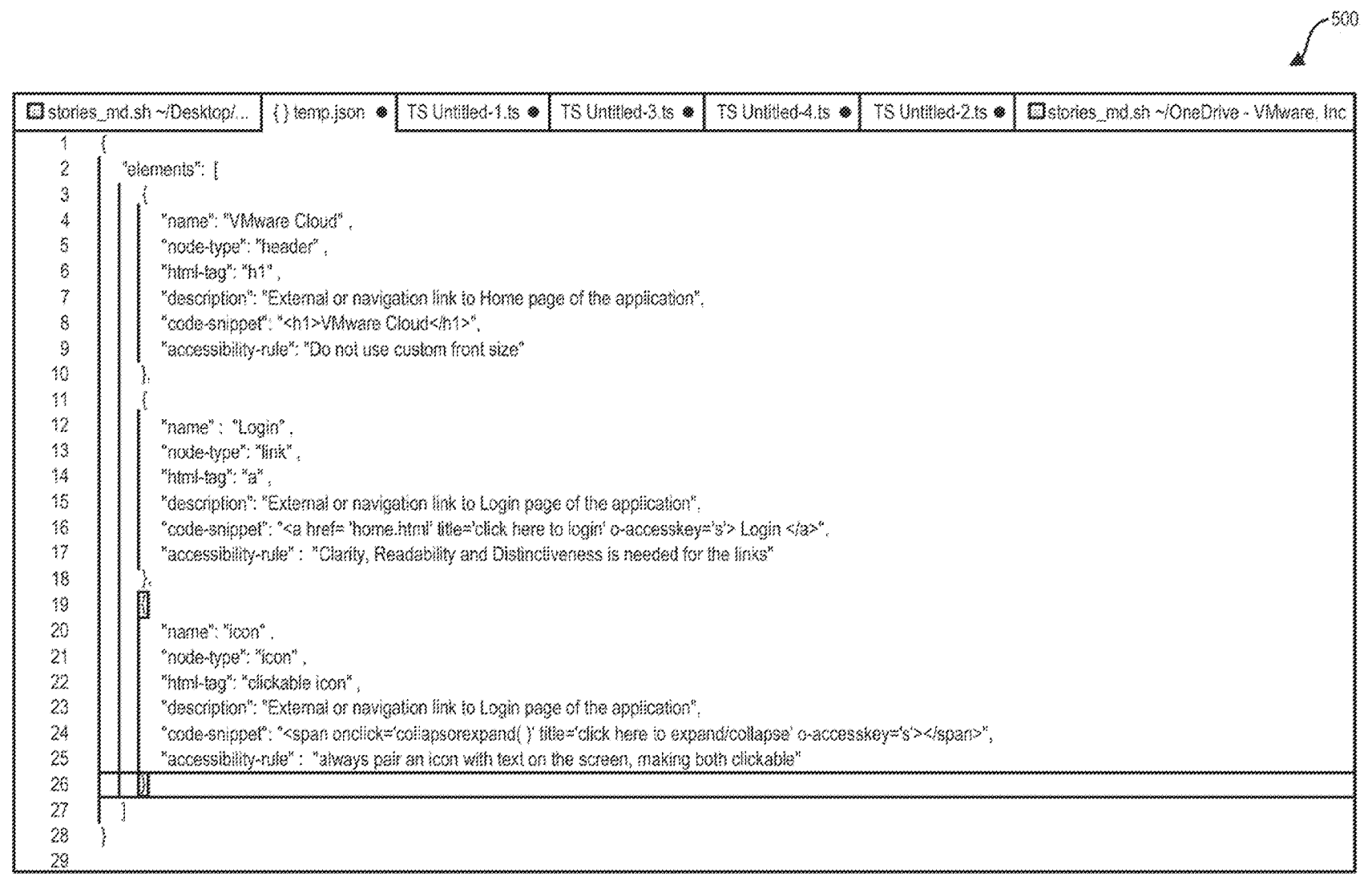

In FIG. 4, a table 400 showing an example of information that is produced by the accessibility rule identifier 114 in accordance with an embodiment of the invention is depicted. As shown in FIG. 5, the information included in the table 400 includes node or element types, the extracted page elements associated with the different node types, a11y rules for the extracted page elements, and code snippets that can be used during development.

Turning now to FIG. 5, an example of an accessible list 500 generated by the accessibility rule identifier 114 in accordance with an embodiment of the invention is depicted. As shown in FIG. 5, the accessible list 500 includes thematic elements found in an input UX prototype page image with various information for the thematic elements. For each thematic element, the information includes the name, the node type, the description, the code snippet and accessibility rule for that thematic element.

The mapping training unit 116 operates to train the current mapping model used by the accessibility rule identifier 114 to make future improvements and accurate mapping of page elements with a11y rules and their respective code snippets. In an embodiment, the mapping training unit 116 may use deep learning and continuous learning Machine Learning (ML) algorithm to training the mapping model using information in the current thematic element data store 118. Since the thematic element data store 118 is updated at each iteration with possibly new thematic words, the mapping model can be better trained for future usage. The mapping training unit 116 also tracks any changes to the accessibility code samples, which may be stored in the accessibility rule data store or anywhere in the data source inventory 108, and any update to a11y rules so that these changes/updates can be used for training the mapping model. After the training process executed by the mapping training unit 116, the results are passed to the generator module 106. In an alternative embodiment, the results from the accessibility rule identifier 114 may be transmitted in parallel to the mapping training unit 116 and to the generator module 106 for parallel processing.

The generator module 106 operates to receive the accessible list from the accessibility rule identifier 114 and generate accessible UX design guidance materials for the input UX prototype page image. In an embodiment, the accessible UX design guidance materials include a marked-up UX prototype page image and a corresponding descriptor file. The marked-up UX prototype page image is a copy of the input UX prototype page image that has been marked with indicators to map to the corresponding descriptor file, which includes complete details of a11y guidelines to be followed by a developer for different page elements in the input UX prototype page image. The associated descriptor file is a detailed version of the output marked-up UX prototype page image. The associated descriptor file includes a list of accessibility details, such as, but not limited to, element name, element type, HTML tag to be used, accessibility rule and sample code snippets. As shown in FIG. 1, the generator module 106 includes a mock generator 124 and a descriptor file generator 126.

The mock generator 124 operates to generate the marked-up UX prototype page image using the input UX prototype page image and the accessible list for the input UX prototype page image from the accessibility rule identifier 114. In an embodiment, the mock generator 124 may use simple numbering indexes to mark all the identified page elements of the input UX prototype page image with unique numbers next to the elements in the marked-up UX prototype page image. Thus, for an input UX prototype page image with n page elements, numbers 1 to n are used to index the n page elements in the output marked-up UX prototype page image. However, in other embodiments, any graphical indicators or identifiers may be used to identify the extracted page elements in the input UX prototype page image. For special page components, the location information of the page components may be used to embed the graphical indicators or identifiers.

Figure 6:
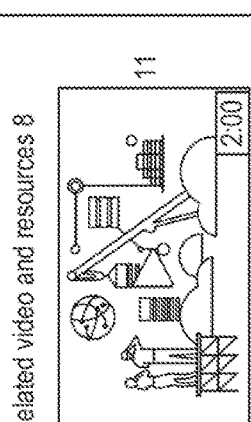
FIG. 6 shows an example of a marked-up UX prototype page image produced by a mock generator of the accessible UX design system in accordance with an embodiment of the invention.

An example of a marked-up UX prototype page image 600 produced by the mock generator is illustrated in FIG. 6. The marked-up UX prototype page is based on a copy of the input UX prototype page 200 depicted in FIG. 2. The marked-up UX prototype page image shows indexing numbers 1 to 32, which indicate the various elements found in the original input UX prototype page image.

The descriptor file generator 126 operates to generate the corresponding descriptor file for the marked-up UX prototype page image. In an embodiment, the descriptor file produced by the descriptor file generator 126 may be a JSON file that includes a JSON object with multiple child objects with the accessibility details, such as element name, node type, HTML tag to be used, code samples, accessibility rules and sample code snippets. As an example, the JSON object may include the following:

Elements: represents all the extracted page elements of the input UX prototype page image and includes child objects of individual element details.
Name: element text from the input UX prototype page image.
Node Type: element type, such as the HTML element type, from the predefined element types.
Accessibility Rule: a11y rule for the element to be implemented by developer.
HTML Tag—HTML tag to be used for the element for this accessibility rule.
Description: additional description about the element and the accessibility rule to be applied.
Code Snippet: one or more actual sample code examples that can be used for implementing the accessibility rule.

Figure 7:
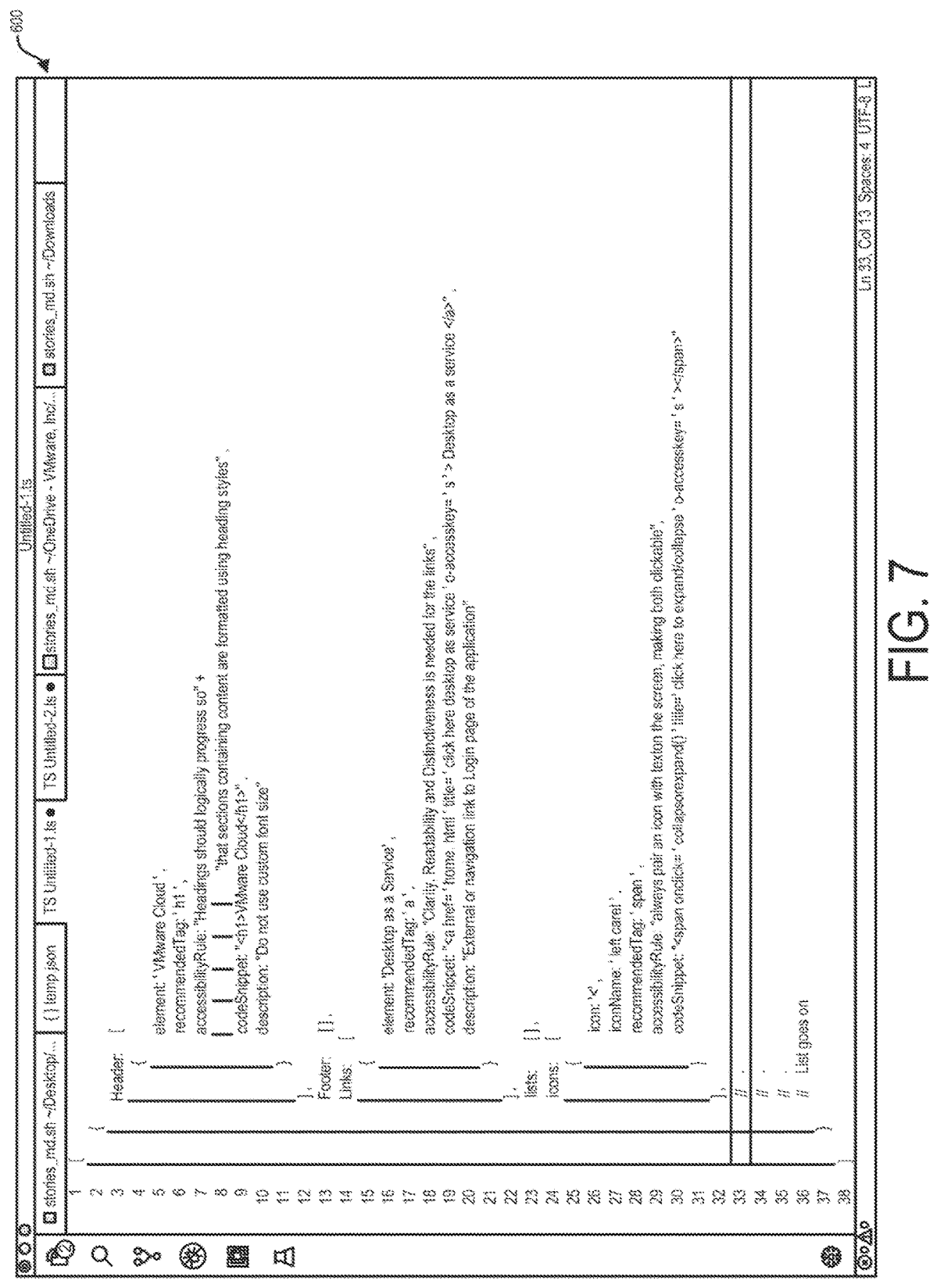

An example of a descriptor file 700 in the form of a JSON object produced by the descriptor file generator 126 is illustrated in FIG. 7. The JSON object includes various extracted page elements and their details, such as their element names, HTML tags, a11y rules, code snippets and descriptions.

The marked-up UX prototype page image and the corresponding descriptor file are the accessible UX design guidance materials generated by the accessible UX design system 100. The accessible UX design guidance materials provided by the system 100 can greatly assist developers during the development of the software product with a11y rules that are needed for the software produce, as well as implementation details in a format that can be readily consumed. Since the accessible UX design system 100 only requires page images of a software product, the system can be used in early stages of development to ensure proper compliance with applicable ally rules, which reduces the need to correct the software product in late stages of development to correct ally rule issues.

A list of broad ally issue categories that can be handled by the accessible UX design system 100 are shown in the table below.

| Type of Disability | Disability Description |
|---|---|
| Vision | Complete blindness, color blindness or poor vision. Visual problems, such as visual strobe and flashing effect problems. |
| Physical | Not able to use the mouse or keyboard with one hand. Poor motor skills, such as hand movements and muscle slowness |
| Cognitive | Learning difficulties, poor memory, or not able to understand more complex scenarios. |
| Literacy | Reading problems |
| Hearing | Auditory problems, such as deafness and hearing impairments. Unable to hear or not able to hear clearly. |

There are many specific ally issues under these broad ally issue categories that can be handled by the accessible UX design system 100. Some of the common ally issues that can be handled by the accessible UX design system 100 are listed below.
1. Low contrast on text, e.g., low color contrast on text.
2. Missing alternative text on images, e.g., missing image alternative text on images.
3. Missing link text. Missing link text means that there is no text used to represent a hyperlink. The hyperlink might be just an image or a button. Thus, someone who cannot visually see the site and uses a screen reader instead cannot interpret it as a link. This can be resolved by either hyperlinking applicable text or including alternative text for the link.
4. Ambiguous link text. Instead of hyperlinking the ambiguous text, it may be better to use brief, but informative text.
5. Too many navigations links. A better way to do this might be using search bars, sub navigations, or a skip navigation link. Skip navigation links provided before menu items allow users to skip the navigation and go directly to an anchor point, usually at the start of the site content.
6. Empty form labels. These labels are not always clear or readable to a screen reader.
7. Unclear form controls.

Turning back to FIG. 1, the computer model used by the IRCA unit 110 of the processing module should be trained well to increase its performance to a desired level. In order to train the computer model well, a broad set of UX prototype page image examples is needed. These UX prototype page image examples should include special components, as well as common page elements. The computer model is trained using the UX prototype page image examples, as well as pre-processed data available in the data source inventory 108 to correctly identify page elements in input UX prototype page images. In an embodiment, these UX prototype page images for software products need to follow a general page layout standards, for example, (1) with a header, body and footer, (2) in a single non-corrupt file with proper file extension (any image format supported by image recognition can be used). In addition, each UX prototype page image should follow the following specific guidelines to be successfully processed.
1) Should include markers for all the elements on the page (until enough accessibility compliant UX prototype page images are available for training the model accurately).
Example marker list is

```
{
  a - anchor,
  ul, ol - lists,
  li - list items
  h1,h2.... - header items
  etc.....
}
```

2) Mandatory header, footer, and body components should be defined/marked/input.

In addition, in order to train the computer model well, each individual component (low contrast on text, missing form label etc.) in the UX prototype page image should have different samples which are accessibility compliant. Also, the model should be trained and built using multiclass classification algorithms, such as Naive Bayes or convolutional neural networks (CNNs) with the X variable being the UX prototype page image and the Y variable being the actual component name.

In addition, all the UX prototype page images should be normalized to a fixed size (e.g., 100 by 100 pixels). Furthermore, data augmentations on the UX prototype page images (rotating the image, flipping the image etc.) should be performed to have more variations in the data which can then provide a more accurate model. With the final set of UX prototype page images, the data should be split into training, testing and validation sets for the model generation. In an embodiment, the model for the IRCA unit 110 may be generated using pretrained models, such as Google Net, Dense Net etc.

The training of the computer model should be continued until the model reaches a desired threshold accuracy, for example, 80%, in finding the various page elements or components in the UX prototype page images along with the coordinates. Then, a rule engine should be used to find out the accessibility rules applicable to each of these detected elements. The final step is to generate a new UX prototype page image with the general accessibility guidelines embedded as suggestions for each of the elements detected.

Figure 8A:
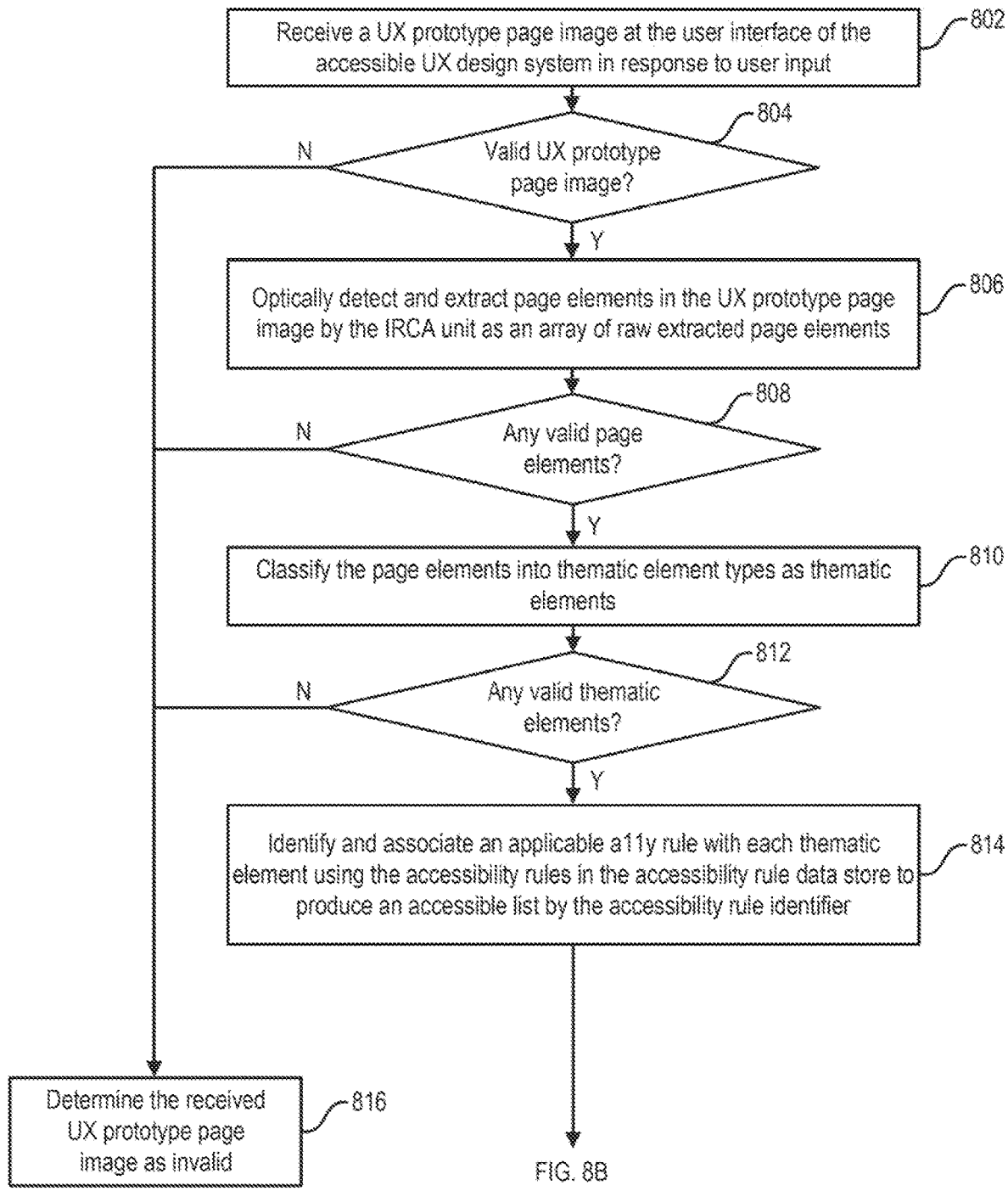
FIGS. 8A and 8B show a process flow diagram of an operation of the accessible UX design system in accordance with an embodiment of the invention.
Figure 8B:
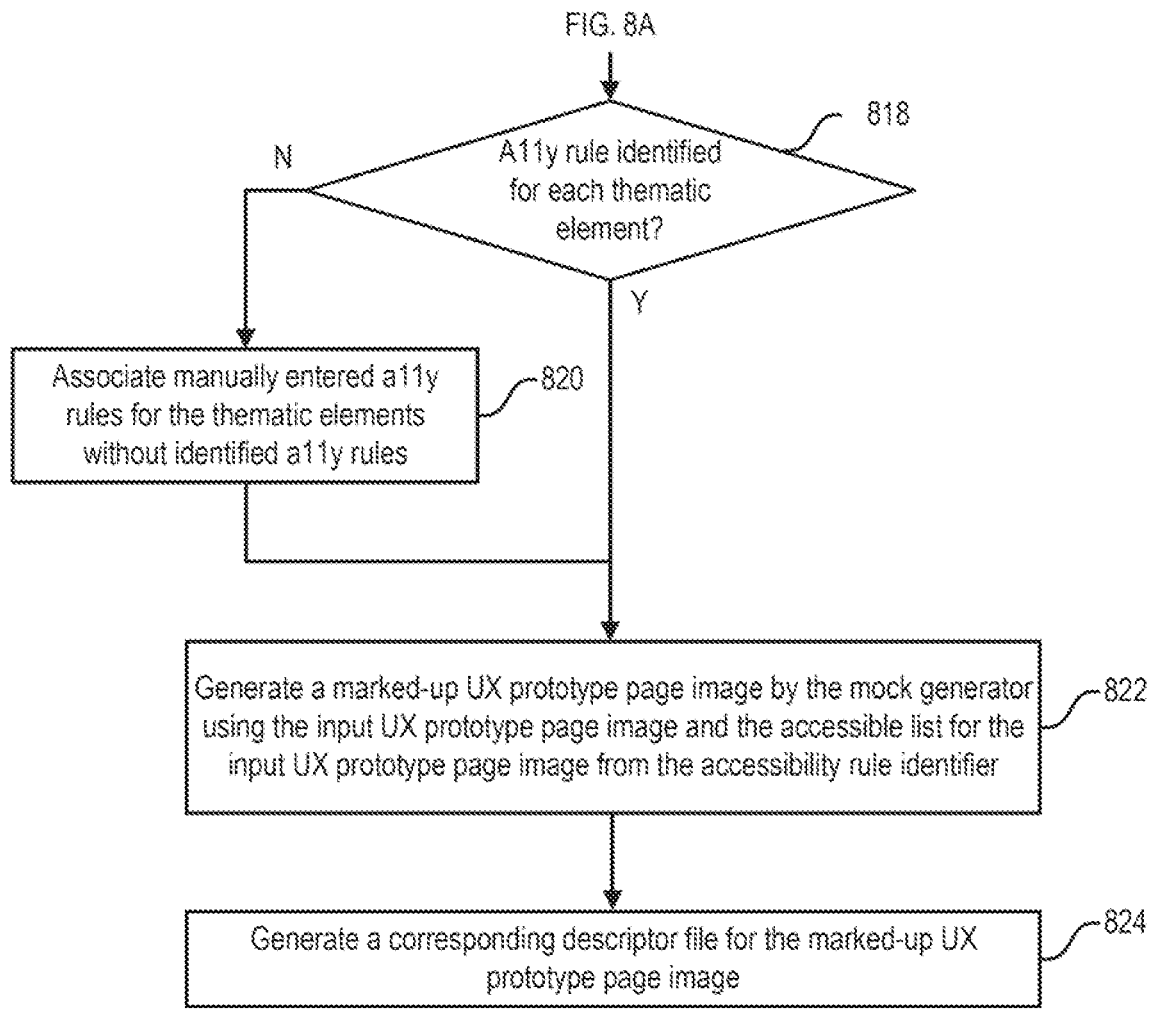

FIGS. 8A and 8B show a process flow diagram of an operation of the accessible UX design system 100 in accordance with an embodiment of the invention. The operation begins at step 802, where a UX prototype page image is received at the user interface 102 of the accessible UX design system 100 in response to user input. In an embodiment, the user interface 102 allows the user to input the presence of any special components in the input UX prototype page.

Next, at step 804, a determination is made by the user interface 102 whether the received UX prototype page image is a valid prototype page image. This determination may be based on one or more factors, such as size and file format of the received UX prototype page image. If the received UX prototype page image is not a valid UX prototype page image, then the operation proceeds to step 816, where the input UX prototype page image is determined to be an invalid UX prototype page image. In some embodiments, an error message for the user may be generated by the accessible UX design system 100 when the input UX prototype page image is determined to be an invalid UX prototype page image. The operation then comes to an end.

However, if the received UX prototype page image is a valid UX prototype page image, the operation proceeds to step 806, where page elements in the UX prototype page image are optically detected and extracted by the IRCA unit 110 of the processing module 104 as an array of raw extracted page elements.

Next, at step 808, a determination is made by the IRCA unit 110 whether any valid page elements have been found in the received UX prototype page image. If no valid page element has been found in the received UX prototype page image, then the operation proceeds to step 816, where the input UX prototype page image is determined to be an invalid UX prototype page image. The operation then comes to an end.

However, if one or more valid page elements have been found, the operation proceeds to step 810, where the page elements in the array of raw extracted page elements are classified into thematic element types as thematic elements by the thematic element finder 112 of the processing module 104. In an embodiment, the thematic element finder 112 may use one or more machine learning algorithms to classify the extracted page elements to predefined thematic element types, which may include standard HTML semantic element types, such as header, body and footer.

Next, at step 812, a determination is made by the thematic element finder 112 whether any valid thematic elements have been found, i.e., has any extracted page element been classified into one of the thematic element types. If no valid thematic element has been found, then the operation proceeds to step 816, where the input UX prototype page image is determined to be an invalid UX prototype page image. The operation then comes to an end.

However, if one or more valid thematic elements have been found, the operation proceeds to step 814, where an applicable ally rule is identified and associated with each thematic element using the ally rules in the accessibility rule data store 118 to produce an accessible list by the accessibility rule identifier 114 of the processing module 104.

Next, at step 818, a determination is made by the accessibility rule identifier 114 whether an ally rule has been identified for each of the thematic elements in the accessible list from the thematic element finder 112. If an ally rule has been found for each of the thematic elements, the operation proceeds to step 822 to generate UX design guidance materials for the received input UX prototype page image. However, if an ally rule has not been found for each of the thematic elements, the operation proceeds to step 820, where manually entered ally rules for the thematic elements without identified ally rules are associated with the respective thematic elements. In an embodiment, an option is presented to the user via the user interface 102 to manually enter an ally rule for each of the thematic elements for which ally rules have not been found in the ally rule data store 120. The operation then proceeds to step 822.

At step 822, a marked-up UX prototype page image is generated by the mock generator 124 of the generator module 106 using the input UX prototype page image and the accessible list for the input UX prototype page image from the accessibility rule identifier 114. The marked-up UX prototype page image is a copy of the received UX prototype page image that has been marked with indicators to map to a corresponding descriptor file, as illustrated in FIG. 6. The marked-up UX prototype page image is one of the accessible UX design guidance materials provided by the accessible UX design system 100.

Next, at step 824, the corresponding descriptor file for the marked-up UX prototype page image is generated by the descriptor file generator 126 of the generator module 106 using the accessible list from the accessibility rule identifier 114. The corresponding descriptor file, which may be a JSON file, is a detailed version of the marked-up UX prototype page image, which may include element name, element type, HTML tag to be used, accessibility rule and sample code snippets, as illustrated in FIG. 8. The corresponding descriptor file is another accessible UX design guidance material provided by the accessible UX design system 100.

Figure 9:
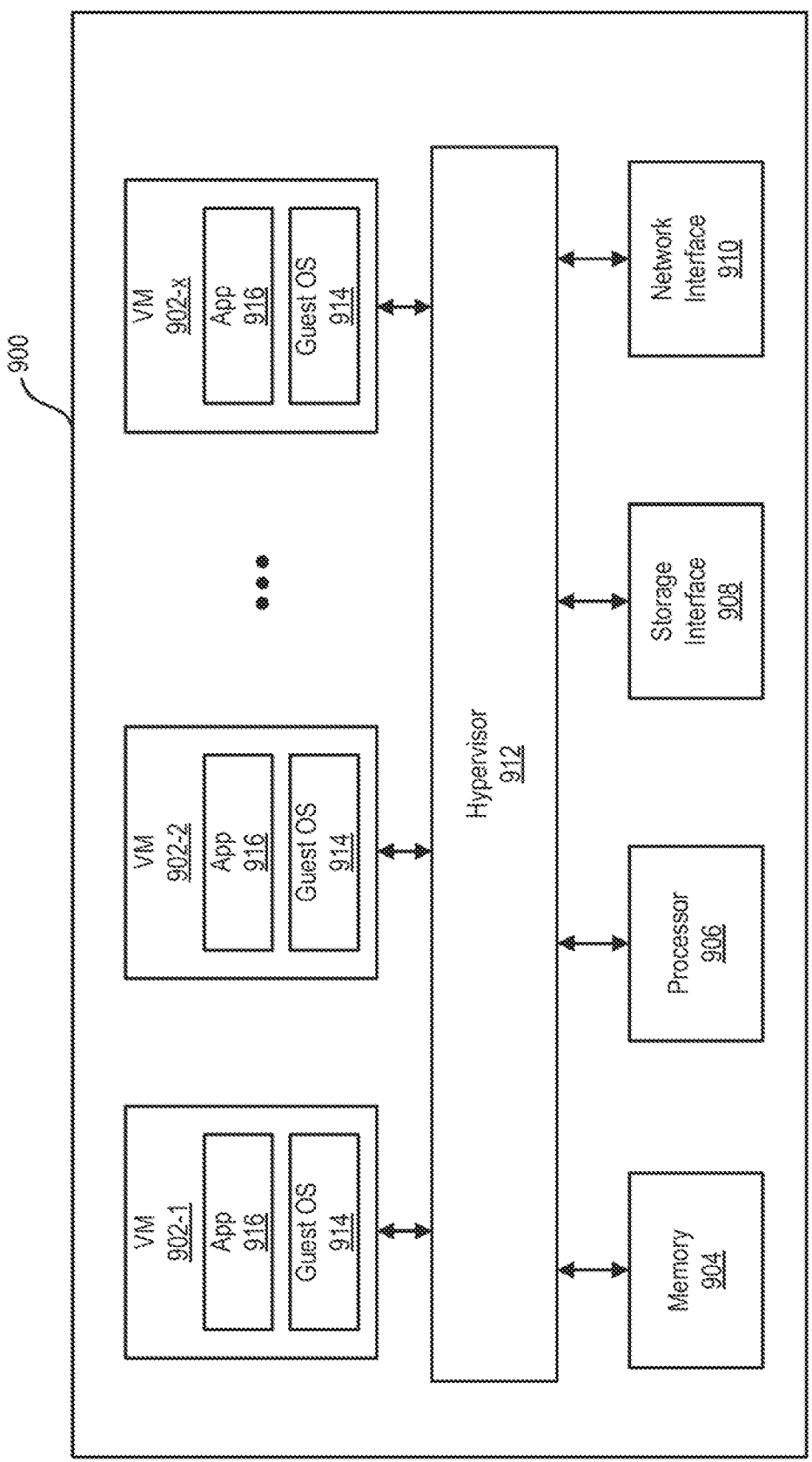
FIG. 9 is a block diagram of a host computer on which at least a portion of the accessible UX design system may be implemented in accordance with an embodiment of the invention.

The accessible UX design system 100 may be implemented as software on one or more computer systems, which may be virtual or physical computer systems. A host computer 900 on which at least a portion of the accessible UX design system 100 may be implemented in accordance with an embodiment of the invention is illustrated in FIG. 9. In the illustrated embodiment, the host computer 900 is configured to support a number of virtual computing instances 902-1, 902-2 . . . 902-x (where x is a positive integer). As used herein, the term "virtual computing instance" refers to any software processing entity that can run on a computer system, such as a software application, a software process, a virtual machine or a virtual container. A virtual machine is an emulation of a physical computer system in the form of a software computer that, like a physical computer, can run an operating system and applications. A virtual machine may be comprised of a set of specification and configuration files and is backed by the physical resources of the physical host computer. A virtual machine may have virtual devices that provide the same functionality as physical hardware and have additional benefits in terms of portability, manageability, and security. An example of a virtual machine is the virtual machine created using VMware vSphere® solution made commercially available from VMware, Inc of Palo Alto, California A virtual container is a package that relies on virtual isolation to deploy and run applications that access a shared operating system (OS) kernel. An example of a virtual container is the virtual container created using a Docker engine made available by Docker, Inc. In the illustrated embodiment, the virtual computing instances in the host computer 900 are virtual machines (VMs). However, in other embodiments, the virtual computing instances in the host computer 900 may be other types of virtual computing instances.

The VMs 902-1, 902-2 . . . 902-x supported by the host computer 900 share at least some of the hardware resources of the host computer, which include system memory 904, one or more processors 906, a storage interface 908, and a network interface 910. The system memory 904, which may be random access memory (RAM), is the primary memory of the host computer. The processor 906 can be any type of a processor, such as a central processing unit (CPU) commonly found in a server. The storage interface 908 is an interface that allows that host computer to communicate with a storage (not shown). As an example, the storage interface may be a host bus adapter or a network file system interface. The network interface 910 is an interface that allows the host computer to communicate with other devices via a computer network. As an example, the network interface 910 may be a network adapter.

In the illustrated embodiment, the VMs 902-1, 902-2 . . . 902-x run on "top" of a hypervisor 912, which is a software interface layer that, using virtualization technology, enables sharing of the hardware resources of the host computer 900 by the VMs. However, in other embodiments, one or more of the VMs can be nested, i.e., a VM running in another VM. Any computer virtualization architecture can be implemented. For example, the hypervisor may run on top of the host computer's operating system or directly on hardware of the host computer. With the support of the hypervisor, the VMs provide isolated execution spaces for guest software. Each VM may include a guest operating system 914 and one or more guest applications 916. The guest operating system manages virtual system resources made available to the corresponding VM by the hypervisor 912, and, among other things, the guest operating system forms a software platform on top of which the guest applications 916 run.

The VMs 902-1, 902-2 . . . 902-x are able to communicate with each other using an internal software OSI Layer 2 switch (not shown) and with other computer systems connected to the host computer 900 using the network interface 910 of the host computer. In addition, the VMs are able to access storage using the storage interface 908 of the host computer.

Figure 10:
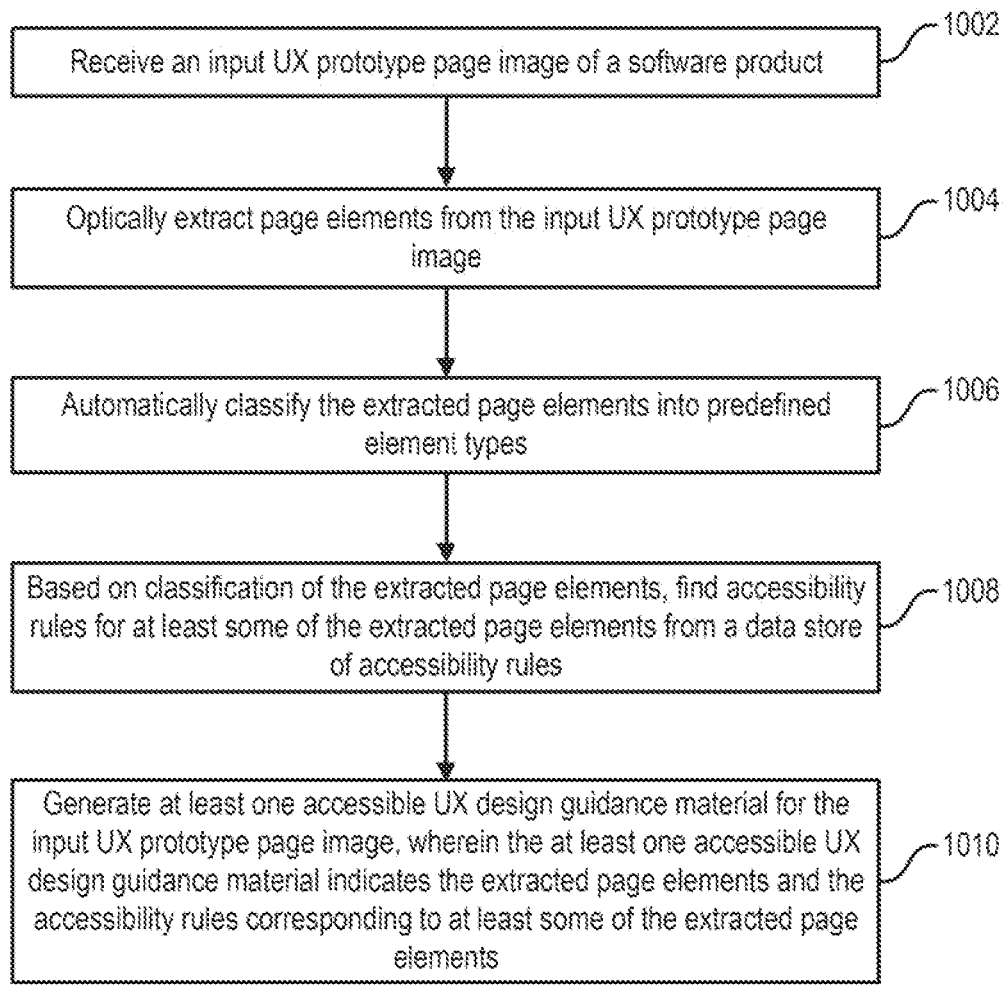
FIG. 10 is a flow diagram of a computer-implemented method for generating accessible user experience (UX) design guidance materials for software products in accordance with an embodiment of the invention.

A computer-implemented method for generating accessible user experience (UX) design guidance materials for software products in accordance with an embodiment of the invention is described with reference to a flow diagram of FIG. 10. At block 1002, an input UX prototype page image of a software product is received. At block 1004, page elements are optically extracted from the input UX prototype page image. At block 1006, the extracted page elements automatically classified into predefined element types. At block 1008, based on classification of the extracted page elements, accessibility rules for at least some of the extracted page elements are found from a data store of accessibility rules. At block 1010, at least one accessible UX design guidance material for the input UX prototype page image is generated. The accessible UX design guidance material indicates the extracted page elements and the accessibility rules corresponding to at least some of the extracted page elements.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for generating accessible user experience (UX) design guidance materials for software products, the method comprising:
   receiving an input UX prototype page image of a software product;
   optically extracting page elements from the input UX prototype page image;
   automatically classifying the extracted page elements into predefined element types;
   based on classification of the extracted page elements, finding accessibility rules for at least some of the extracted page elements from a data store of accessibility rules, wherein each of the accessibility rules corresponds to a particular page element type for the extracted page elements that is needed for the software product for accessibility compliance;
   creating a list of the extracted page elements and their respective accessibility rules, wherein each entry of the list includes a particular extracted page element and a corresponding accessibility rule for that particular extracted page element and wherein the list includes code snippets for the at least some of the extracted page elements, the code snippets being actual sample code examples that can be used for implementing the accessibility rules for the at least some of the extracted page elements; and
   generating at least one accessible UX design guidance material for the input UX prototype page image, wherein the at least one accessible UX design guidance material indicates the extracted page elements and the accessibility rules corresponding to the at least some of the extracted page elements.

2. The method of claim 1, wherein the list of the extracted page elements and their respective accessibility rules includes HyperText Markup Language (HTML) semantic tags for the at least some of the extracted page elements.

3. The method of claim 1, wherein optically extracting the page elements from the input UX prototype page image includes optically extracting the page elements from the input UX prototype page image using Optical Character Recognition (OCR) engine that has been trained using artificial intelligence.

4. The method of claim 1, wherein automatically classifying the extracted page elements into the predefined element types includes automatically classifying the extracted page elements into the predefined element types using one or more machine learning algorithms.

5. The method of claim 1, wherein the predefined element types include HyperText Markup Language (HTML) semantic element types.

6. The method of claim 1, wherein generating the at least one accessible UX design guidance material for the input UX prototype page image includes generating a marked-up UX prototype page image, the marked-up UX prototype page image being a copy of the input UX prototype page image with indicators for the extracted page elements.

7. The method of claim 6, wherein generating the at least one accessible UX design guidance material for the input UX prototype page image includes generating a descriptor file that includes at least the extracted page elements and the accessibility rules corresponding to the at least some of the extracted page elements.

8. A non-transitory computer-readable storage medium containing program instructions for generating accessible user experience (UX) design guidance materials for software products, wherein execution of the program instructions by one or more processors of a computer system causes the one or more processors to perform steps comprising:
   receiving an input UX prototype page image of a software product;
   optically extracting page elements from the input UX prototype page image;
   automatically classifying the extracted page elements into predefined element types;
   based on classification of the extracted page elements, finding accessibility rules for at least some of the extracted page elements from a data store of accessibility rules, wherein each of the accessibility rules corresponds to a particular page element type for the extracted page elements that is needed for the software product for accessibility compliance;
   creating a list of the extracted page elements and their respective accessibility rules, wherein each entry of the list includes a particular extracted page element and a corresponding accessibility rule for that particular extracted page element and wherein the list includes code snippets for the at least some of the extracted page elements, the code snippets being actual sample code examples that can be used for implementing the accessibility rules for the at least some of the extracted page elements; and
   generating at least one accessible UX design guidance material for the input UX prototype page image, wherein the at least one accessible UX design guidance material indicates the extracted page elements and the accessibility rules corresponding to the at least some of the extracted page elements.

9. The computer-readable storage medium of claim 8, wherein the list of the extracted page elements and their respective accessibility rules includes HyperText Markup Language (HTML) semantic tags for the at least some of the extracted page elements.

10. The computer-readable storage medium of claim 8, wherein optically extracting the page elements from the input UX prototype page image includes optically extracting the page elements from the input UX prototype page image using Optical Character Recognition (OCR) engine that has been trained using artificial intelligence.

11. The computer-readable storage medium of claim 8, wherein automatically classifying the extracted page elements into the predefined element types includes automatically classifying the extracted page elements into the predefined element types using one or more machine learning algorithms.

12. The computer-readable storage medium of claim 8, wherein the predefined element types include HyperText Markup Language (HTML) semantic element types.

13. The computer-readable storage medium of claim 8, wherein generating the at least one accessible UX design guidance material for the input UX prototype page image includes generating a marked-up UX prototype page image, the marked-up UX prototype page image being a copy of the input UX prototype page image with indicators for the extracted page elements.

14. The computer-readable storage medium of claim 13, wherein generating the at least one accessible UX design guidance material for the input UX prototype page image includes generating a descriptor file that includes at least the extracted page elements and the accessibility rules corresponding to the at least some of the extracted page elements.

15. A system for generating accessible user experience (UX) design guidance materials for software products, the system comprising:
   memory; and
   at least one processor configured to:
   receive an input UX prototype page image of a software product;
   optically extract page elements from the input UX prototype page image;
   automatically classify the extracted page elements into predefined element types;
   based on classification of the extracted page elements, find accessibility rules for at least some of the extracted page elements from a data store of accessibility rules, wherein each of the accessibility rules corresponds to a particular page element type for the extracted page elements that is needed for the software product for accessibility compliance;
   create a list of the extracted page elements and their respective accessibility rules, wherein each entry of the list includes a particular extracted page element and a corresponding accessibility rule for that particular extracted page element and wherein the list includes code snippets for the at least some of the extracted page elements, the code snippets being actual sample code examples that can be used for implementing the accessibility rules for the at least some of the extracted page elements; and
   generate at least one accessible UX design guidance material for the input UX prototype page image, wherein the at least one accessible UX design guidance material indicates the extracted page elements and the accessibility rules corresponding to the at least some of the extracted page elements.

16. The system of claim 15, wherein the at least one processor is configured to generate a marked-up UX prototype page image as an accessible UX design guidance material, the marked-up UX prototype page image being a copy of the input UX prototype page image with indicators for the extracted page elements.

17. The system of claim 16, wherein the at least one processor is configured to generate a descriptor file as another accessible UX design guidance material that includes at least the extracted page elements and the accessibility rules corresponding to the at least some of the extracted page elements.

\* \* \* \* \*